June 7, 1932. S. S. FURRER 1,861,741
DISK HARROW
Filed April 20, 1929 5 Sheets-Sheet 3

INVENTOR:
Samuel S. Furrer,
BY
ATTORNEY.

June 7, 1932.  S. S. FURRER  1,861,741
DISK HARROW
Filed April 20, 1929  5 Sheets-Sheet 4
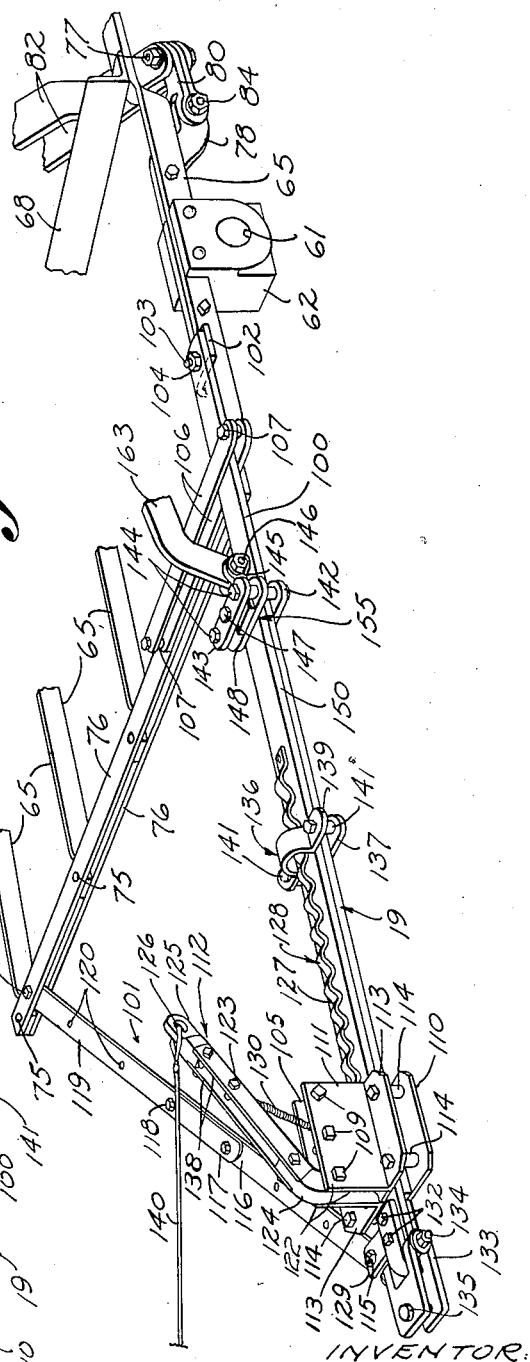
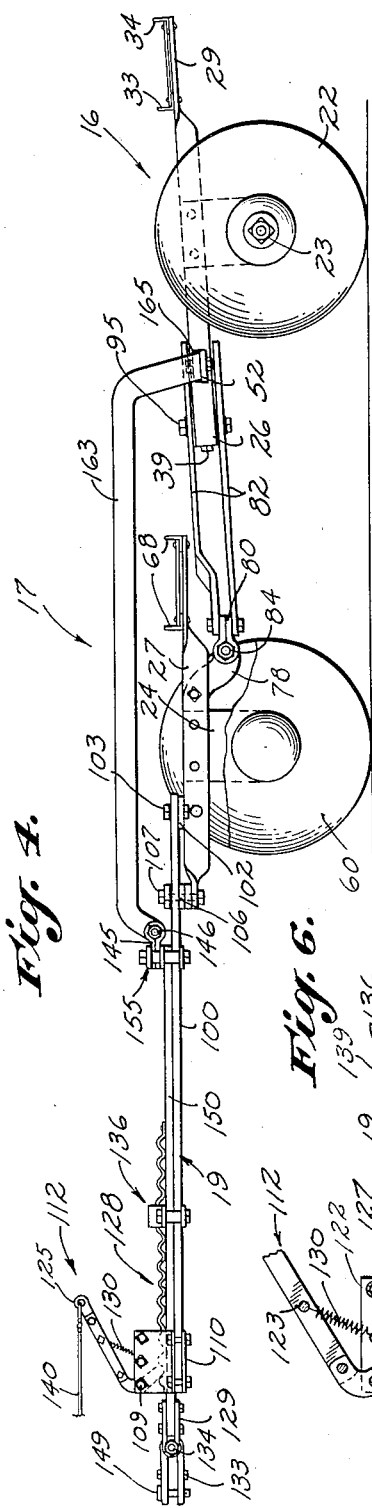
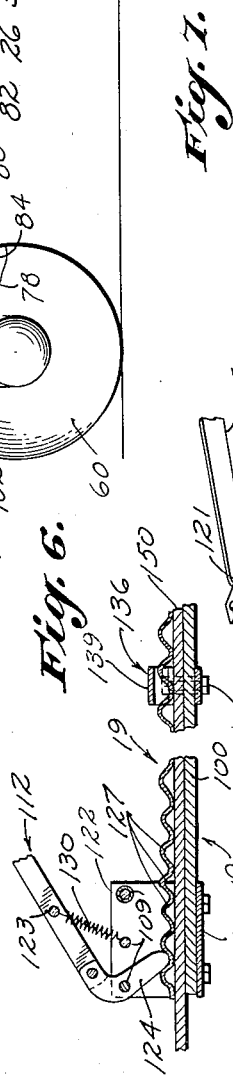
INVENTOR:
Samuel S. Furrer,
BY
ATTORNEY.

June 7, 1932.                S. S. FURRER                1,861,741
                              DISK HARROW
                     Filed April 20, 1929    5 Sheets-Sheet 5
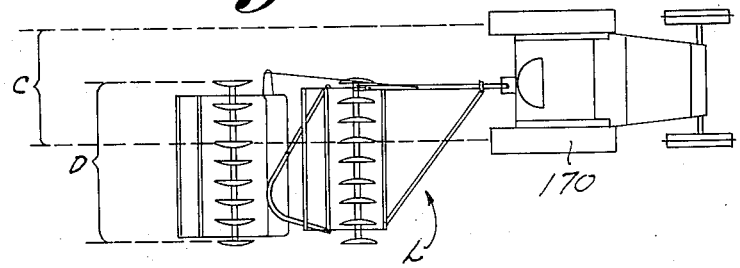
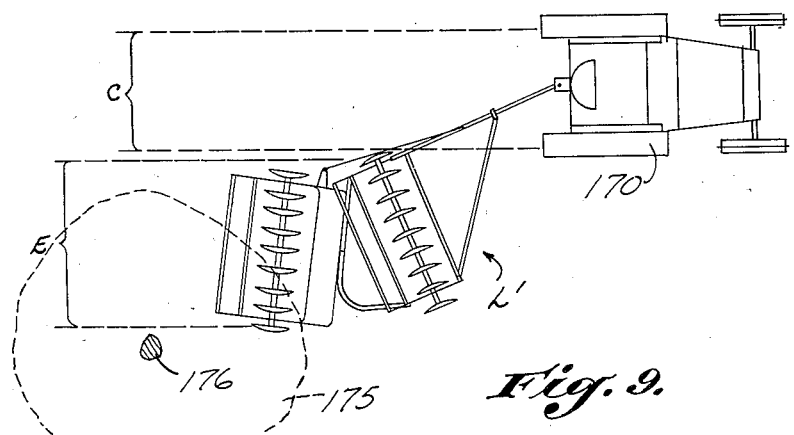
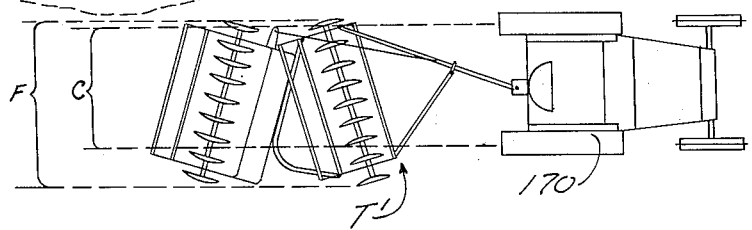
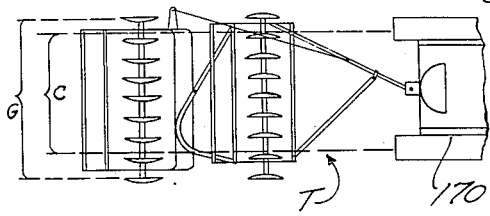
INVENTOR:
Samuel S. Furrer,
BY
ATTORNEY.

Patented June 7, 1932

1,861,741

UNITED STATES PATENT OFFICE

SAMUEL S. FURRER, OF OXNARD, CALIFORNIA, ASSIGNOR TO BRENNEIS MANUFACTURING COMPANY, OF OXNARD, CALIFORNIA, A CORPORATION OF CALIFORNIA

DISK HARROW

Application filed April 20, 1929. Serial No. 356,832. REISSUED

My invention relates to disk harrows and more particularly to a novel harrow of the two-gang type, such as is shown in my co-pending application, Serial Number 159,800, filed January 8, 1927, of which this application is a continuation in part.

In the cultivating of orchards with disk harrows it has been found difficult to cultivate underneath trees having foliage which extends close to the ground because the harrows in use at present follow directly after the tractor by which they are drawn. It thus becomes necessary for the tractor to pass close to the trunk of the tree under which it is desired to work the ground and the tractor is of such height that the foliage of the tree is frequently damaged.

It is one of the principal objects of my invention to provide a harrow which is of relatively low height and which is adapted to work ground in a path which extends to one side of the path of the tractor which draws the harrow. With a harrow of this type the ground may be worked beneath low hanging foliage without the necessity of thrusting the foliage aside by the passage of the tractor therebeneath, and consequently the danger of damaging the foliage is practically eliminated.

In most of the disk harrows as previously made, a front gang element and a rear gang element are connected together and drawn by a tractor in such a manner that a relative movement between the tractor and a portion of one of the front or rear gang elements will cause the shifting of these elements relative to each other so that they will be moved between working and non-working positions. In effecting this shifting of the gang elements it has previously been necessary for the tractor to push portions of the harrow a considerable distance which makes the handling of such a harrow in a small space a very awkward matter.

It is a further object of my invention to provide a two-gang harrow in which the gangs may be shifted relative to each other between working and non-working positions by a comparatively short movement of the tractor.

It is a still further object of my invention to provide a two-gang harrow which may be easily controlled so that it will either trail behind the tractor or be extended laterally to a working position to one side of the path of the tractor.

It is a tendency of the following gang of a two-gang disk harrow when in working position to dig in deeper at one end than at the other. It is another object of my invention therefore to provide a means for causing the rear gang to engage the earth equally throughout its length when the harrow is in working position.

Another feature of harrows as made at present which prevents their being used for cultivating beneath low hanging foliage in an orchard is the presence upon the harrow of levers or other parts which extend upward from the harrow on portions of the harrow which might otherwise pass easily beneath said foliage. It is therefore an object of my invention to provide a disk harrow which is adapted for cultivating beneath low hanging foliage in an orchard and which is free from members extending above the disks of the harrow excepting at the side of the harrow which is disposed away from the trees under which the harrow is adapted to cultivate.

Further objects and advantages will be made manifest in the following description and in the accompanying drawings, in which Fig. 1 is a plan view of a preferred embodiment of the harrow of my invention in a non-working position.

Fig. 4 is a side elevational view of the harrow and is taken in the direction of the arrow 4 of Fig. 1.

Fig. 5 is a front view of a detail along the line 5—5 of Fig. 1.

Fig. 6 is a vertical sectional view taken on the line 6—6 of Fig. 1.

Fig. 7 is a fragmentary perspective view of portions of the framework of the harrow in which the connection between the front gang and inter-gang yoke is more clearly illustrated.

Figs. 8 to 11 inclusive are diagrammatic plan views illustrating the various positions in which the harrow of my invention may be drawn by a tractor.

Figure 1:
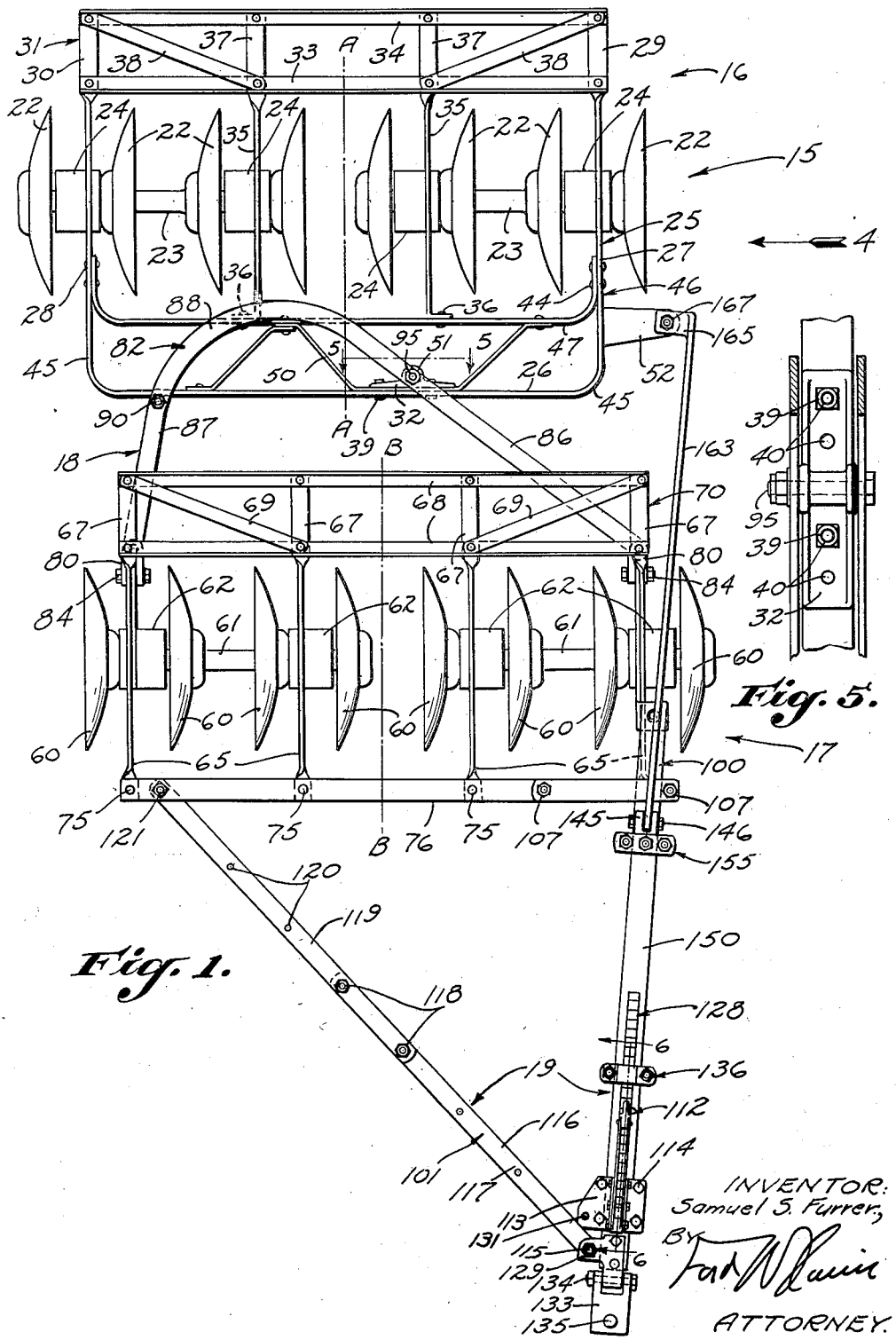

Referring to the drawings in detail, a harrow 15, as shown in Fig. 1, includes a rear gang 16, a front gang 17, an inter-gang yoke 18, and a draft yoke 19.

The rear gang 16 includes two series of gangs of disks 22 mounted upon axles 23 which are journalled in bearing blocks 24 held on a main frame bar 25. The main frame bar 25 is bent to form a transverse bar 26 and side bars 27 and 28. The rearmost portions 29 and 30 of the side bars 27 and 28 are twisted into horizontal position and provide ends for a rectangular box-like frame 31 which includes transverse angle irons 33 and 34 which connect the side bar portions 29 and 30. Intermediate bars 35 are connected, as by spot welding or riveting, to the central bearing blocks 24 and at their forward ends 36 to a transverse stiffening member 47 held to the side bars 27 and 28 by rivets 44.

The intermediate bars 35 are twisted at their rear ends to form horizontal portions 37 which are attached to the transverse angle irons 33 and 34 intermediate of their ends. The frame 31 may be suitably braced by diagonal strips 38.

The main frame bar 25, the member 47, bars 33, 34, and 35 comprise a rear gang control frame 46, the portions of the side bars 27 and 28 extending beyond the connections of member 47 therewith being bent to form side bars 45 for the transverse bar 26, and bar 26 and member 47 are braced by an S bar 50 adapted to be connected at its nodes with bar 26 and member 47 by rivets or other suitable means.

As particularly illustrated in Figs. 1 and 5, the S bar 50 is held to bar 26 by a bracket 32 having a plurality of adjusting holes 40 therein to co-act with similar holes in the bar 26, whereby the bracket may be laterally moved with respect to the bar 26 by removing and changing the position of bolts 39. The bracket 32 is constructed to have a vertical hole 51 therein for a purpose to be later described, and the center of the hole 51 is disposed close to the fore and aft central axis A—A of the rear gang 16. An arm 52 is welded or bolted to one of the side bars 45 and preferably extends outwardly beyond the outermost of the disks 22 of the rear gang 16 to pivotally hold mechanism to be later described.

The front gang 17 has two series of gangs of disks 60 mounted upon axles 61 which are journalled in bearing blocks 62 which are held by fore and aft bars 65. The rear end portions 67 of bars 65 are twisted to lie in a horizontal plane and are connected by transverse angle irons 68 and diagonal members 69 to form a frame 70, substantially identical with the frame 31 of the rear gang 16, each frame being fashioned at its rear end to form a weight box. The extreme forward ends of the bars 65 are bent to lie in a horizontal plane and are connected by rivets 75 to upper and lower forward transverse bars 76.

The connection between the frames 31 and 70 includes an inter-gang yoke 18 comprising upper and lower guide bars 82 of the same size and shape, each being bent to form long and short legs 86 and 87 connected by a curved portion 88. The included angle between the long leg 86 and the bar 26 is substantially equal to the maximum angle to which the rear gang 16 is angled when in working position, and the bars 82 are held in spaced relation by a tube-and-rivet spacer element 90, the distance therebetween being such as to permit entry of bar 26 and the bracket 32 between the upper and lower guide bars 82.

The upper guide bar 82 is bent down at each end and bracket straps 80 are secured tightly at one end between the guide bars 82 by a tight bolt 77, the other ends of the straps 80 being pivotally secured to drop members 78 bolted to the outside fore and aft bars 65 of the front frame by pivot bolts 84.

When the harrow is assembled in a non-working position, as shown in Figs. 1 and 4, the guide bars 82 lie on the top and bottom of the frame 46, particularly on the transverse bar 26 of the frame of the rear gang 16 and the bracket 32, the leg 86 being apertured near the fore and aft central axis B—B of the front gang 17 to receive a bolt 95 which passes through both the guide bars 82 and the vertical bore 51 of the bracket 32. The bolt 95 has a bushing surrounding its shank within the bore 51, so that the bolt 95 may be tightened and still permit horizontal movement of the rear frame 31.

The pivot bolts 84 are likewise bushed to permit a relative flexibility between the front and rear gangs 17 and 16.

It will thus be seen that the rear and front gangs 16 and 17 may be moved pivotally relative to each other about the bolt 95 and the bolts 84, but the inter-gang yoke 18 prevents any great difference in elevation between the front end of the rear frame 31 and the rear end of the front frame 70 and acts as a stiffener, guide and/or evener for controlling the pivotal movements of the rear frame 31 about the bolt 95.

A certain amount of flexibility is given to the relative movements of the frames 31 and 70 about the horizontal bolts 84 which is desired when passing over obstructions to prevent twisting of the frame members, the draft from the front frame 70 to the rear frame 31 being applied through the bolts 84 and 95.

The draft yoke includes a main draft link 100 and a lateral brace 101, which latter is adjustable in length. A plate 102 is formed by turning out the forward end of the drop member 78 and supports a threaded stud 103 which is bushed to receive and horizontally pivotally hold the inner end of the link 100 by means of a nut 104.

A pair of draft link guide bars 106 are held in spaced relation by suitable tube and bolt spacers 107, the lowermost of the bars 106 being suitably fastened, as by welding, to the uppermost of the transverse bars 76 of the front frame 70, the link 100 being held between the bars 106 to permit horizontal movement thereof between the spacer members 107, but only permitting a limited vertical movement sufficient for the free working of the link 100.

A tie plate 110 is welded to the lower face of the link 100 at its forward end and extends transversely from the link 100 on opposite sides thereof. A body plate 111, split centrally to support a lever pawl 112, has bases 113 practically coextensive with the tie plate 110 and held in spaced relation thereto by tube and bolt spacer members 114.

The plates 110 and 111 extend towards the fore and aft central axis B—B and have holes 131 to receive a pivot bolt 115 for supporting the forward end of a bar 116 forming part of the brace 101, and in this manner the brace 101 may be pivotally held on the main draft link 100, as described in my aforesaid copending application, but a preferred method of attaching the bar 116 to the draft yoke 19 to give a new mode of operation will be herein set forth.

The bar 116 is provided with a plurality of holes 117 through which it is adjustably connected by bolts 118 to a bar 119 having a plurality of holes 120, the two joined bars forming the brace 101, and the rear end of the bar 119 being disposed between the bars 76 of the front frame 70 and pivotally secured therebetween by a bolt 121 which passes through suitable apertures in the bars 76 and 119.

The body plate 111 is divided into two portions to provide a central slot 105 formed by vertical lugs 122 on the bases 113 spaced by a plurality of tube and bolt members 109, on one of which the lever pawl 112 is pivotally held between said lugs.

One end of the lever pawl 112 is formed of two members 138 spaced by tube and bolt members 123 on one of which is held one end of a tension spring 130, the other end of the spring 130 being fastened to one of the members 109 within the slot 105. The lever pawl 112 includes members 138, a solid portion 124 fulcrumed at the bolt 109, and a solid portion 125 having an orifice 126 at its opposite end. The portion 124 is adapted to be held in engagement with depressions 127 of a toothed ratchet member 128 rigidly fastened to a sliding draft link 150 by the tension of the spring 130, which tension may be removed by pulling on a cord 140 fastened in the orifice 126 and exercised by the driver of a tractor, to which the harrow 15 is attached, from his seat thereon.

The sliding draft link 150 is adapted to lie upon the upper face of the forward portion of the main draft link 100 so that the forward end of the link 150 extends between the draft link 100 and the bases 113, the ratchet member 128 extending through the slot 105 below the bolts 109.

A loop 129, comprising a piece of metal bent to form upper and lower portions of equal size, is bolted to the forward end of the sliding link 150 by bolts 132 and has extensions thereon apertured to receive the bolt 115 and pivotally support the brace 101 in a preferred position.

The loop 129 is connected to a clevis 133 by a pivot bolt 134, to the end that a bolt may pass through holes 135 and thus connect the implement to the draw-bar of a tractor, the bolt in holes 135 and the bolt 134 thus providing a universal joint movement.

A sliding link guide member 136 has a lower plate 137 welded to the main draft link 100 and has an upper arched member 139 connected thereto by tube and bolt spacer members 141 for the purpose of holding the links 100 and 150 in alignment.

A second guide member 155 is provided at the rear end of the link 150 to maintain the links 100 and 150 in alignment and also to provide a connection to the rear gang 16. This is accomplished by welding a plate 142 to the draft link 100 on its lower face and suitably fastening plates 148 and 143 above its upper face by tube and bolt spacer members 144, a central bolt 147 being adapted to extend through plates 148 and 143 and hold a bracket 145 for pivotal movement thereon in a horizontal plane.

The guide members 136 and 155 and the slot 105 provide that free sliding movement between the links 100 and 150 is assured in a relatively fixed position.

An angling bar 163 is adapted to be pivotally connected at one end to a bracket 145 by a bolt 146, the bar 163 being bent to clear frames 31 and 70, and has its rear end bent inwardly to form a foot 165 resting on the arm 52 fastened to the side bar 46 of the rear frame 31, and pivotally connected thereto by a bolt 167.

The portion of my disk harrow is as follows: When the parts of the harrow 15 are assembled as shown in Fig. 1, the harrow is connected by a pin 149 through holes 135 to the draw-bar of a tractor 170 as illustrated in Fig. 10. The harrow is then in a lateral, or offset, non-working position L. The path of the tractor 170 is indicated by the letter C in Figs. 8 to 11 inclusive.

The two gangs 16 and 17 are substantially parallel and follow a path D, when drawn in position L, which is approximately the central fore and aft axis of the harrow 15 as a whole and which is considerably to one side of the tractor path C. In this position the disks 22 of the rear gang 16 will ordinarily follow in the tracks of the disks 60 of the front gang 17, but, according to the adjustment of the bracket 32 as shown in Fig. 1, may be a little to one side for a reason to be presently explained.

Upon advancement of the tractor 170, harrow 15 will follow on the path D, the draft of the tractor being applied through the yoke 19, frame 70, pivots 84, and the intergang yoke 18 to the rear frame 31 through the pivot 95.

It should be particularly noted that the pivot 95 is close to the central fore and aft axis of the harrow as a whole but is much closer to the axles 23 of the rear gang 16 than to the axles 61 of the front gang 17. This latter position is especially desirable in order to pull the gangs into correct working relation and the former position provides a long lever arm, from the pivot 95 to the pivot 167 through the frame 46, so that a minimum draft is required to pull and hold the rear frame in working angle.

The length of such lever arm is approximately one-half the length of the rear frame 46 transversely of its central fore and aft axis.

By additionally referring to Fig. 6 it will be seen that, the pull of the tractor 170 being applied to the front frame 70 through the sliding link 150 and the main draft link 100, the position of the portion 124 of the lever pawl 112 with respect to the grooves 127 and ridges forming the toothed ratchet 128 is such that the sliding link 150 is locked against forward movement, due to the relative positions of the fulcrum pin 109 and the first groove 127, enforced by the spring 130.

Due to the same relative positions the harrow may now be backed in parallel position inasmuch as the bar 26 of the rear frame 31 is in touch with the stop member 90, and the thrust of the tractor 170 through the angling bar 163 maintains such parallelism. In other words, with this setting of the draft yoke 19, the gangs of the harrow 15 may only be backed in parallelism, thus permitting its easy manipulation.

If now it be desired to change from the position L in Fig. 10 to the working position L' in Fig. 11, on continued forward motion of the tractor 170, the operator from his seat on the tractor will pull the cord 140, whereby the portion 124, due to its rounded end fitting grooves 127 more or less, will be easily released from the ratchet 128. This release permits the forward motion of the tractor to be applied through the angling bar 163 to the rear gang 16, and to the front gang simultaneously by the forward movement of brace 101 with the sliding link 150 until the gangs reach the desired working angle, whereupon the cord 140 is released and the portion 124 of the lever pawl 112 drops into a groove 127 of the ratchet 128 and is locked there during forward motion of the tractor.

As soon as the gangs are thus locked in forward motion, the harrow 15 as a whole swings in offset position entirely outside of the outside edge of the tractor wheels and remains in such working position.

In this manner, a preferred mode of operation not only angles the gangs simultaneously but causes the harrow to assume its offset position.

While the forces which cause this double function are not fully understood, the result is highly desirable, inasmuch as the harrow 15 may cultivate under low hanging branches of trees while the tractor continues down the center of a row of such trees and, furthermore, the full width of the harrow 15 is free to cultivate in soil which is not packed by the weight of the tractor to any degree.

It is believed that the thrust of the soil against the disks of the rear gang 16 when the same is first angled causes such offsetting, because such may be partially regulated by the position in which the sliding link 150 is locked and in consequence varying the working angle of the rear gang 16, but in any event there may be other causes in obtaining the known results.

In many orchards, and particularly in orange orchards, the branches and foliage of the trees are allowed to grow close to the ground and great difficulty has been hitherto encountered in the effort to cultivate the ground up close to the trees without damaging the lower foliage of the trees. In Fig. 11 a tree is indicated by the broken line 175, this tree having a trunk 176. When the gangs of my harrow are in the working position L', the disks thereof sink into the ground and the axle and frame portions of the gangs are disposed very close to the surface of the ground. There being no superstructure which rises above the disks except along the edge of the harrow nearest the tractor, the harrow is thus able to pass under the edge of the tree 175 close to the trunk 176 with practically no damage to the low hanging foliage of the tree.

This is an important feature of my invention as at present time there are great losses from the damaging of trees and the destruction of fruit upon the trees in the endeavor to cultivate the earth up close to the trunks thereof.

Further, if now it is desired to again pull the harrow 15 in parallel position for any reason, nothing need be done but stop the tractor and back the same without touching any part of the harrow, whereupon the thrust of the tractor will force the gangs into parallelism simultaneously and on continued forward motion the harrow 15 will be in the original position L, as shown in Fig. 10.

Figure 2:
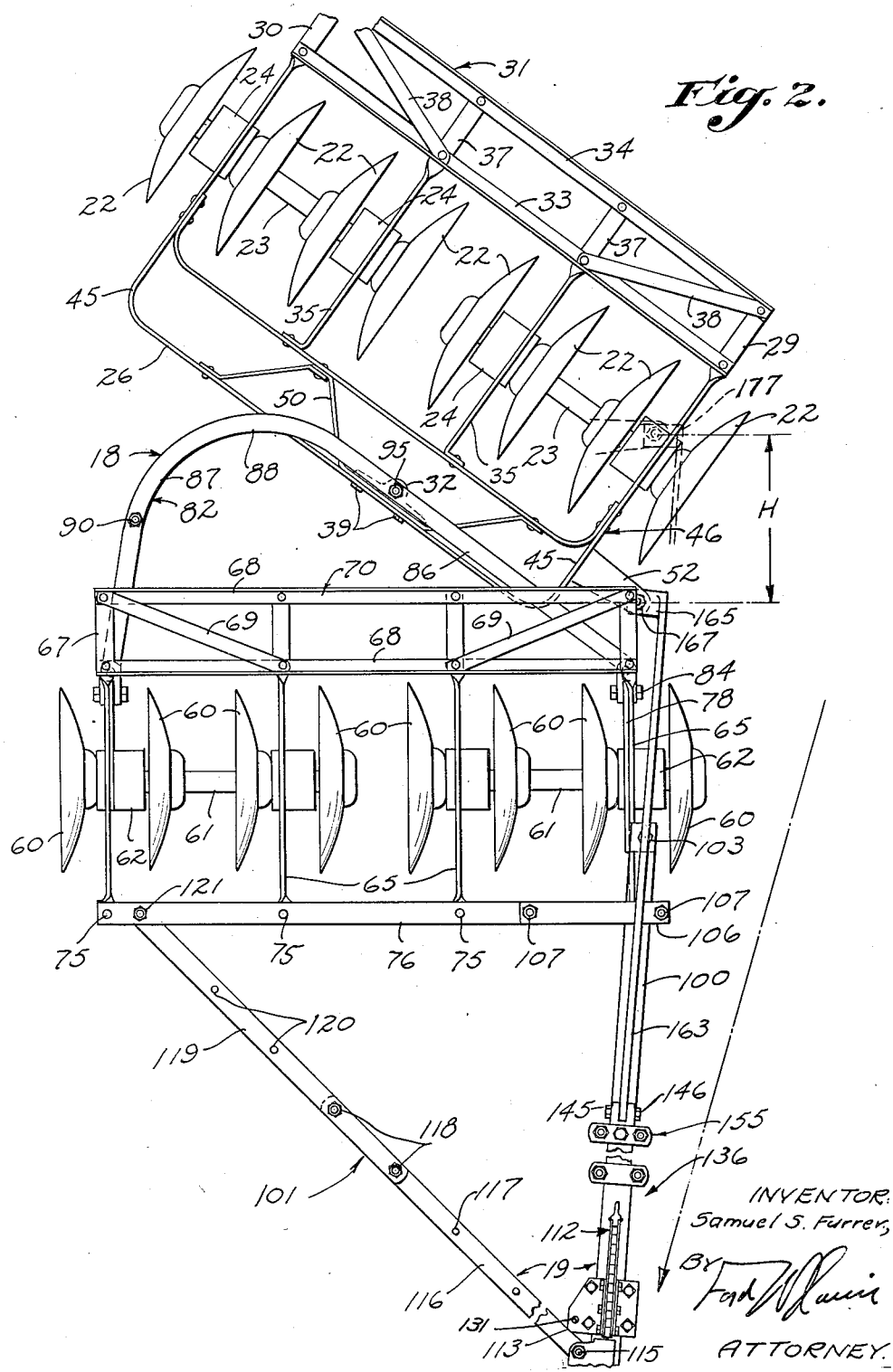
Fig. 2 is a view similar to Fig. 1 and shows the harrow in a working position.
Figure 3:
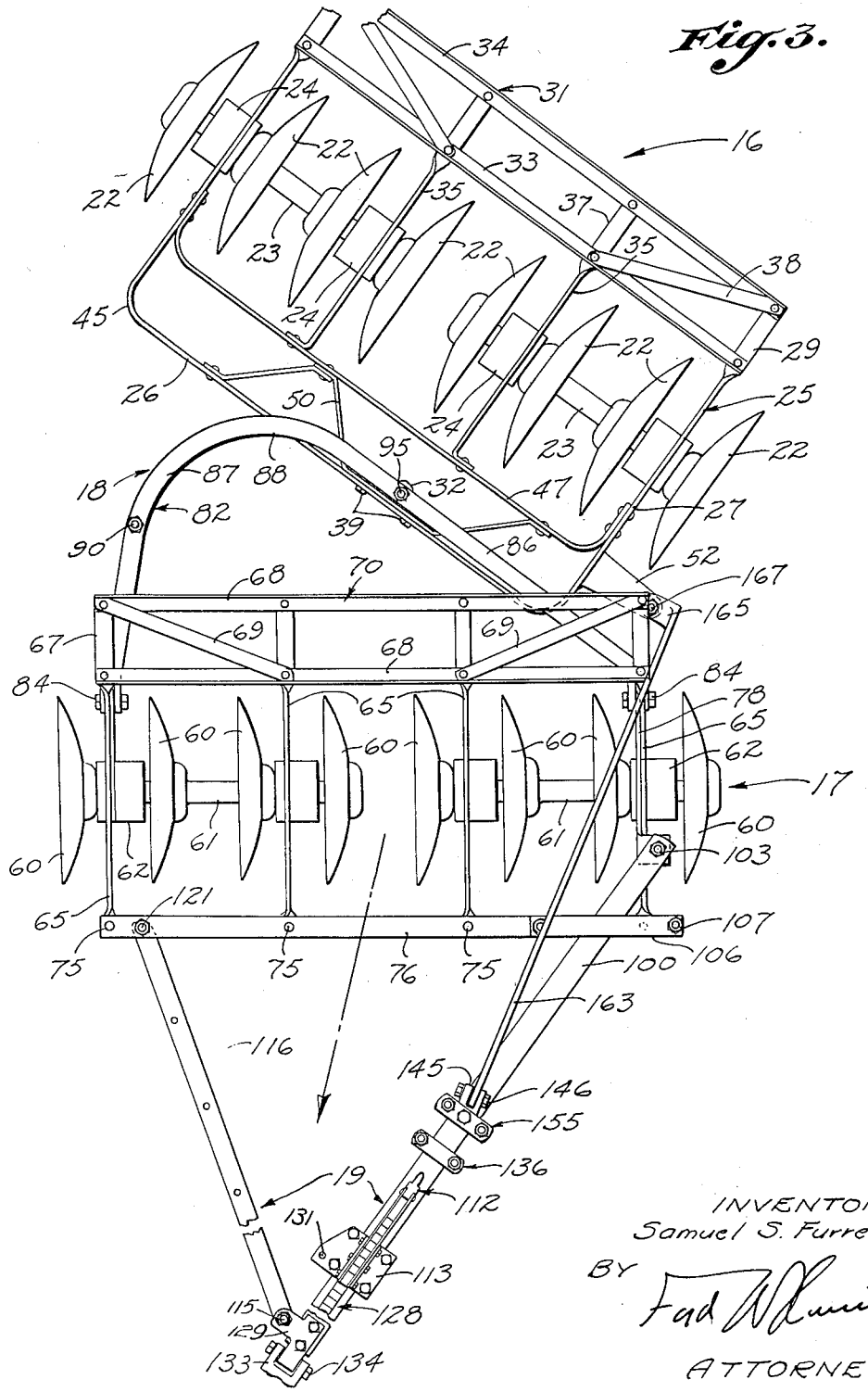
Fig. 3 is a view similar to Figs. 1 and 2 and shows the harrow in a different working position from that in which it is shown in Fig. 2.

Another important feature of my invention is the connection between the front and rear gangs, which permits the angling of these gangs by a relatively short movement of the tractor relative to the harrow. For instance in Fig. 2 the position of the arm 52 when the harrow is in the position L is indicated by the broken lines 177. The distance which it is necessary for the tractor to move relative to the harrow 15 in order to angle the gangs from the position L to the position L' is indicated by the letter H. This distance in actual practice is about 2 feet with a six-foot cut of disks and about 20 inches with a four-foot six-inch cut of disks, and permits very quick manipulation of the harrow by the operator of the tractor. Also the restoring of the gangs to parallel position is accomplished by a backward movement of the tractor a distance H relative to the harrow 15, which distance by the above figures may be seen to be approximately one-third the width of the cut of the disks.

When it is desired to draw the harrow 15 behind the tractor 170 upon a highway, it is preferable that the harrow trail behind in a non-working position T, as shown in Fig. 8. In order to cause the harrow 15 to assume this position or any other intermediate position, the brace 101 may be adjusted and shortened by removing the bolts 118 and replacing these in different combinations of the holes 117 and 120. In general the longer the brace 101 is made, the more offset the harrow 15 will obtain toward one side of the tractor and the shorter the brace 101 is made, the better the harrow 15 will follow in the tractor path.

Practical reasons will dictate the limits to which the brace 101 will be shortened but as shown in Fig. 8, the shortening of the brace 101 can swing the central fore and aft axis of the whole harrow 15 substantially in line with the central fore and aft axis of the tractor, or even beyond it to the opposite side. In fact the moving of the point of application of the tractive pull of the tractor to the harrow so that this point lies substantially upon the fore and aft central axis of the harrow results in the harrow trailing directly behind the tractor when the harrow is in the non-working position T.

When the harrow is desired to be brought into a working position T', the lever pawl 112 is released and the gangs are angled into working position, as previously described and now illustrated in Fig. 9.

Thus the harrow 15 may be drawn in non-working position T over any public highway and through gates and between other obstacles, where it is necessary that the harrow trail directly behind the tractor, and it may be quickly and easily extended in the field to the non-working and working positions L and L' for the purpose of cultivating underneath the foliage of trees or other low objects as previously described.

As above mentioned briefly, another important feature of my invention is the flexible manner in which the front and rear gangs are connected at the horizontal pivots 84 through the inter-gang yoke 18.

These pivotal connections permit a limited flexing of the gangs with respect to each other and aid in preventing either of the gangs from rising greatly out of the ground without exerting some strain on the other gang, to the end that even cultivation of the ground is aided.

In tandem disk harrows it is preferred that the disks of the rear gang be equal in number and size to the disks of the front gang. It is also necessary that the disks of the rear gang cultivate approximately intermediate of the disks of the front gang when the gangs are angled to working position.

To this end the pivot 95 is located at a point closer to the axles 23 of the rear gang 31 than to the axles 61 of the front gang 17, or closer to lines forming the central axes of such, and likewise close to the central fore and aft axis of the rear gang 31.

Such construction permits the outermost disk 22 of the rear gang, on the end towards which the concavities of the disks 22 are opposed, to be pulled into angle to cultivate intermediate the two outermost disks 60 of the front gang on the same end.

The outermost disk 22 on the opposite end of the rear gang 16 will then cut outside the outermost disk 60 of the front gang 17.

The object of such construction, and of the relative positions of the concavities of the disks as illustrated herein, is to first provide for angling and offsetting the front gang in the right direction by the action of the rear gang, and secondly to maintain a smooth even strip of cultivation, the width of which equals the overall width of the harrow.

The first of these objects is accomplished as already described, and the second is accomplished by the outermost overlapping disks on opposite ends of the gangs, throwing the soil in towards the center of the cultivated strip, due to the positions of the concavities of the disks. This eliminates ridges at the outside edges of such cultivated strip.

Depending on soil conditions, it is sometimes desirable to change the position of the rear gang of disks with respect to the front gang of disks for varying the normal relative center cutting positions.

This is done by removing the bolts 39 from the bracket 32 and replacing the same in other holes 40. This causes the rear gang to be moved relative to the front gang and permits the rear gang disks to cut off center.

The limit to which the rear gang can be angled may be fixed by the position of the member 136, so that the member 155, on complete desired extension of the link 150, will come into contact with the member 136, thus permitting no further angling of the rear gang.

This is of particular advantage when the driver of the tractor does not wish to, or cannot, look back as he has nothing to do except pull on the cord 140 until he hears the members 155 and 136 clash, when the cord may be released.

I claim as my invention:

1. In an offset disk harrow, the combination of: a front frame, disks carried by said frame, a rear frame, disks carried by said frame, means pivotally connecting said frames together, and draft means adapted to be secured to a tractor; said draft means including a linkage connected to one part of the front frame and to the rear frame, and a bar of adjustable length connecting another part of the front frame to said linkage.

2. In an offset disk harrow, the combination of: a front frame, disks carried by said frame, a rear frame, disks carried by said frame, means pivotally connecting said frames together, and draft means adapted to be secured to a tractor for simultaneously angling the frames; said draft means including a linkage connected to one part of the front frame and to the rear frame, and a bar of adjustable length connecting another part of the front frame to said linkage.

3. In an offset disk harrow, the combination of: a front frame, disks carried by said frame, a rear frame, disks carried by said frame, means pivotally connecting said frames together, and draft means adapted to be secured to a tractor for simultaneously angling the frames and offsetting the harrow from the tractor; said draft means including a linkage connected to one part of the front frame and to the rear frame, and a bar of adjustable length connecting another part of the front frame to said linkage.

4. In an offset disk harrow, the combination of: a front frame, disks carried by said frame, a rear frame, disks carried by said frame, means pivotally connecting said frames together, a linkage adapted to connect one part of the front frame and the rear frame to a tractor, an adjustable brace connecting another part of the front frame to said linkage, and means to vary the position of said linkage with respect to the front frame.

5. In an offset disk harrow, the combination of: a front frame, disks carried by said frame, a rear frame, disks carried by said frame, means pivotally connecting said frames together, a linkage adapted to connect one part of the front frame and the rear frame to a tractor, an adjustable brace connecting another part of the front frame to said linkage, a rigid bar connected to the front frame, and means to vary the position of said linkage with respect to said rigid bar.

6. In an offset disk harrow, the combination of: a front frame, disks carried by said frame, a rear frame, disks carried by said frame, means pivotally connecting said frames together, a linkage adapted to connect one part of the front frame and the rear frame to a tractor, an adjustable brace connecting another part of the front frame to said linkage, a rigid bar connected to the front frame, and means to vary the position of said linkage with respect to said rigid bar; said last mentioned means including pawl and ratchet mechanism connecting said rigid bar and said linkage to adjustably hold the same in locked position upon forward motion of the tractor and to permit the linkage to move freely with respect to the rigid bar upon rearward motion of the tractor.

7. In an offset disk harrow, the combination of: a front frame, disks carried by said frame, a rear frame, disks carried by said frame, means pivotally connecting said frames together, draft means adapted to be secured to a tractor and attached to and acting upon the rear frame, a bar of adjustable length connecting one part of the front frame to said draft means, and means for connecting the draft means to another part of the front frame; said connecting means including a pawl and ratchet mechanism.

8. In an offset disk harrow, the combination of: a front frame, disks carried by said frame, a rear frame, disks carried by said frame, means pivotally connecting said frames together, draft means adapted to be secured to a tractor and attached to and acting upon the rear frame, a bar of adjustable length connecting one part of the front frame to said draft means, and means for connecting the draft means to another part of the front frame; said connecting means including a pawl and ratchet mechanism adapted to adjustably hold the frames in locked position upon forward motion of the tractor and to permit free movement of the frames upon rearward motion of the tractor.

9. In an offset disk harrow, the combination of: a front frame, disks carried by said frame, a rear frame, disks carried by said frame, means pivotally connecting said frames together, draft means adapted to be secured to a tractor and attached to and acting upon the rear frame, a bar of adjustable length connecting one part of the front frame to said draft means, a rigid bar fastened to another part of the front frame, and means for connecting said rigid bar and said draft means; said connecting means including a ratchet member coacting with said draft means to lock said frames upon forward motion of the tractor and to permit free movement of the frames upon rearward motion of the tractor.

10. In an offset disk harrow, the combination of: a front frame, disks carried by said frame, a rear frame, disks carried by said frame, means pivotally connecting said frames together, and draft means adapted to be secured to a tractor; said draft means including a rigid bar of variable length connected to one part of the front frame, a linkage of invariable length connected to the rear frame and slidably connected to the front frame at another part, and a ratchet member connecting the front frame and linkage to lock the same upon forward motion of the tractor and permit free movement of the linkage upon rearward motion of the tractor.

11. In an offset disk harrow, the combination of: a front frame, disks carried by said frame, a rear frame, disks carried by said frame, means pivotally connecting said frames together, and draft means adapted to be secured to a tractor; said draft means including a linkage of variable length connected to one part of the front frame, a linkage of invariable length connected to another part of the front frame and to the rear frame, and means to vary the position of the linkage of invariable length with respect to the front frame to move an outer disk of the rear frame a distance approximating one-third of the distance between the cutting edges of the two outside disks in the rear frame.

12. In an offset disk harrow, the combination of: a front frame, disks carried by said frame, a rear frame, disks carried by said frame, means pivotally connecting said frames together, and draft means adapted to be secured to a tractor; said draft means including a linkage of variable length connected to one part of the front frame, a linkage of invariable length connected to another part of the front frame and to the rear frame, and means to vary the position of the linkage of invariable length with respect to the front frame to reduce the distance between an end disk of each frame an amount approximating one-third of the distance between the cutting edges of the two outside disks in the rear frame.

13. In a harrow, the combination of a front frame carrying disks, a rear frame carrying disks, means pivotally connecting said frames together, and means adapted to connect the frames to a tractor; said means including a link connected to the rear frame, a guide on the front frame for said link, means to laterally adjust the position of said link, and means to lock said guide and link in fixed position and to automatically permit free movement of the link upon rearward motion of the tractor.

14. In a harrow, the combination of a front frame carrying disks, a rear frame carrying disks, means pivotally connecting said frames together, and means adapted to connect the frames to a tractor; said means including a link connected to the rear frame, a guide on the front frame for said link, means to laterally adjust the position of said link, means to lock said guide and link in fixed position and to automatically permit free movement of the link upon rearward motion of the tractor, and means to release said lock.

15. In a harrow, the combination of a front frame carrying disks, a rear frame carrying disks, means pivotally connecting said frames together, and means adapted to connect the frames to a tractor; said means including a link connected to the rear frame, a guide on the front frame for said link, means to laterally adjust the position of said link, and adjustable means to lock said guide and link in fixed position and to automatically permit free movement of the link upon rearward motion of the tractor.

In testimony whereof, I have hereunto set my hand at Oxnard, California, this 13 day of April, 1929.

SAMUEL S. FURRER.